Oct. 31, 1967  ÅKE SAMUEL GIDLUND  3,349,767
INJECTION SYRINGE
Filed June 4, 1964
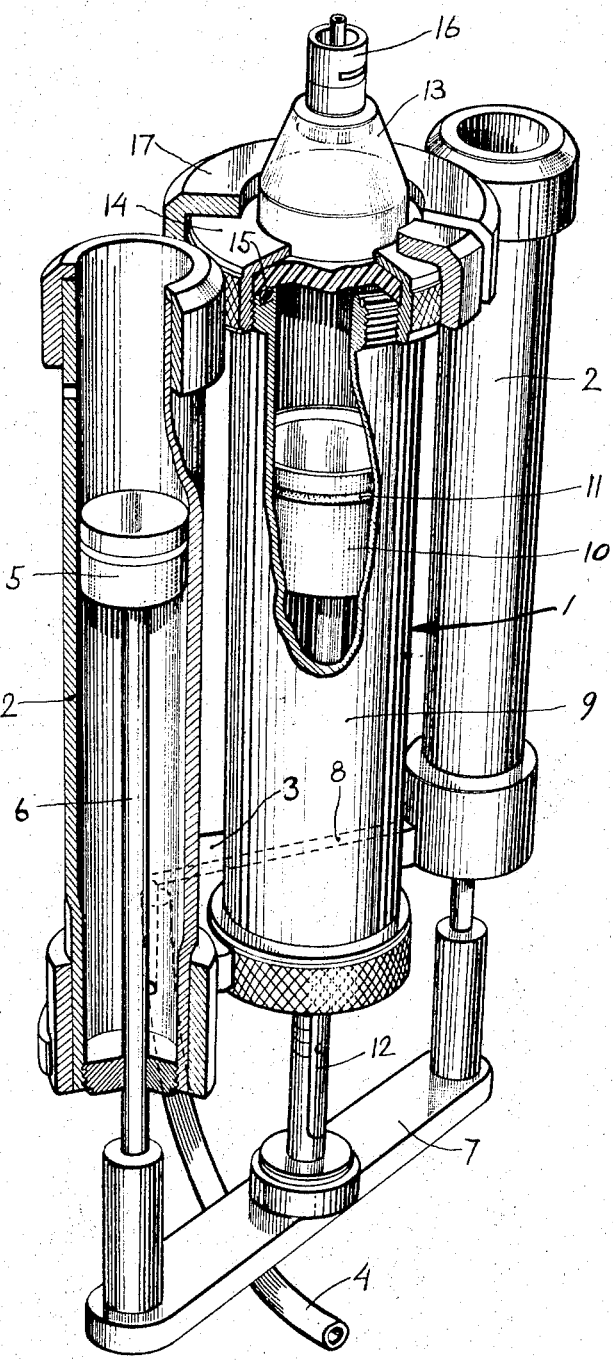
INVENTOR
ÅKE SAMUEL GIDLUND
BY
HIS ATTORNEYS United States Patent Office 3,349,767
Patented Oct. 31, 1967

3,349,767
INJECTION SYRINGE
Ake Samuel Gidlund, Lokevagen 13, Djursholm, Sweden
Filed June 4, 1964, Ser. No. 372,502
Claims priority, application Sweden, June 5, 1963,
6,236/63
1 Claim. (Cl. 128—218)

ABSTRACT OF THE DISCLOSURE

The disclosure herein relates to an injection syringe in which the syringe body comprises a cylindrical portion made of metal which contains the plunger of the syringe and a front portion removably secured to the cylindrical portion made of a transparent material which supports a fastening member for an injection needle or a catheter in the front portion of the syringe body.

The invention relates to an injection syringe, preferably an injection syringe which is subjected to high internal pressure in its use. Such an injection syringe is used, for instance, for a rapid introduction of great quantities of injection liquid into the human body through a catheter which is inserted via a vein. An example is the photography of the heart by means of X-rays. It may be desired to inject, as described, an X-ray contrast composition directly into the heart in a quantity of about 10 milliliters in a fraction of a second.

Such injection syringes have been made of metal so as to be able to resist the high internal pressure. Metal syringes involve the disadvantage that it is not possible to check, in a simple and reliable way, that all air has been removed from the syringe before the injection. Therefore, efforts have been made to make such syringes from a transparent material such as glass and plastic. Glass, however, cannot resist the high pressures which may occur, and plastic expands at these high pressures so as to make the syringe leak.

It has been found, according to the invention, that the demand for transparency and strength can be met if the body of the injection syringe is made in two parts, namely a cylindrical part which contains the plunger and which is made of metal, and a front part which has a fastening member for an injection needle or a catheter and which is made of a transparent material and arranged to be removably fastened to the cylindrical part. Consequently, the injection syringe of the invention is transparent in its front portion only, but this is sufficient for checking that there is no air present before the injection. The transparent part shall preferably be substantially conical. It can have a comparatively thick wall, and can therefore resist a high internal pressure. Some expansion of this transparent part can be allowed, as it does not come into contact with the plunger of the syringe.

The invention will be explained more clearly with reference to the accompanying drawing which illustrates an injection apparatus which contains an injection syringe according to the invention.

The injection apparatus consists of two parallel cylinders 2 for pressurized air, their lower portions being interconnected by a member 3, and their upper portions being interconnected by a ring-shaped member 17 which also serves as securing member for an injection syringe. The cylinders contain plungers 5 having rods 6 which are interconnected by a member 7. Member 3 contains a duct 8 through which pressurized air can be supplied to the cylinders via a hose 4.

An injection syringe 1 is removably fastened between the cylinders and parallel with them. The front end of the syringe is inserted into the ring 17. The injection syringe has a cylindrical body 9 of metal, containing a plunger 10 engaging the cylinder wall tightly by means of a packing ring 11. The plunger has a rod 12, the end of which abuts member 7 loosely.

A substantially conical part 13 of glass, Plexiglas, transparent plastic or other transparent material is arranged on the front end of the cylindrical body 9 of the syringe. The conical part is tightly connected to the body by a sealing ring 15 and can be screwed to the body of the syringe by means of a nut 14. A fastening member 16 for a catheter is secured to the top of the conical part, preferably molded into said top.

When an injection is to be made the syringe and the catheter are filled with the desired quantity of liquid, the syringe is placed with the transparent part up as a check that no air remains in it, and the syringe is then placed between the pressurized air cylinders, the nut 14 being inserted into the ring 17 and the member 7 abutting the end of the rod 12. The catheter is then placed in the desired position. Finally, pressurized air is supplied to cylinders 2, the quantity of pressurized air being controlled with a control valve to give the desired injection velocity.

What is claimed is:

An injection apparatus for a rapid injection of a liquid through a catheter which is introduced into a vein, comprising an injection syringe having a fastening member for said catheter, a syringe body consisting of a fluid pressure cylinder made of metal and a front portion made of a transparent material removably secured to said fluid pressure cylinder which supports said fastening member, a piston located in said fluid pressure cylinder, a piston rod connected to said piston, two parallel pressure cylinders, said injection syringe being removably fastened between said cylinders, means for supplying pressurized fluid to said cylinders, a plunger located in each of said cylinders for pressure responsive movement within said cylinders, and a member connecting said plungers and contacting the end of said piston rod for operating said piston when said pressurized fluid is supplied to said cylinders.

References Cited

UNITED STATES PATENTS

| 187,031 | 2/1877 | McMorries | 128—218 |
| 804,874 | 11/1905 | Nassauer | 128—218 |
| 1,511,827 | 10/1924 | Comer | 128—221 |
| 2,645,223 | 7/1953 | Lawshe et al. | 129—173 |

RICHARD A. GAUDET, Primary Examiner.

ROBERT E. MORGAN, Examiner.